(12) United States Patent
Chen et al.

(10) Patent No.: US 6,898,440 B2
(45) Date of Patent: May 24, 2005

(54) ON-BOARD WIRELESS TRANSACTION SYSTEM AND METHOD

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 744 days.

(21) Appl. No.: 09/987,305

(22) Filed: Nov. 14, 2001

(65) Prior Publication Data

US 2003/0050095 A1 Mar. 13, 2003

(30) Foreign Application Priority Data

Sep. 12, 2001 (TW) ........................................ 90122667 A

(51) Int. Cl.[7] .............................................. H04M 1/00
(52) U.S. Cl. ................ 455/558; 455/456.1; 455/456.2; 455/456.6
(58) Field of Search ................................ 455/558, 405, 455/406, 407, 414.1, 412.1; 705/26; 701/23, 24

(56) References Cited

U.S. PATENT DOCUMENTS

| | | | | |
|---|---|---|---|---|
| 5,903,633 A | * | 5/1999 | Lorsch | ..................... 379/114.2 |
| 6,751,475 B1 | * | 6/2004 | Holmes et al. | ............. 455/557 |
| 2001/0027428 A1 | * | 10/2001 | Suwamoto et al. | ........... 705/26 |
| 2001/0037264 A1 | * | 11/2001 | Husemann et al. | ........... 705/26 |
| 2002/0138350 A1 | * | 9/2002 | Cogen | ......................... 705/15 |
| 2002/0161650 A1 | * | 10/2002 | Buchanan et al. | ............ 705/17 |

* cited by examiner

*Primary Examiner*—Huyen Le
*Assistant Examiner*—Tuan Pham
(74) *Attorney, Agent, or Firm*—Bacon & Thomas PLLC

(57) ABSTRACT

An On-Board wireless transaction system including a card reader/writer and a GSM modem, and adapted for use in a motor vehicle to directly order commodities wirelessly and complete the transaction on the real time. The card reader/writer reads value-added points from a fare card. An On-Board Unit deducts the transaction points from the value-added points and writes the balance points into the fare card upon an ordering demand, and wirelessly transmits the PIN of the fare card and the data of the transaction points with the GSM modem through a GSM wireless network to a shop-end computer for enabling the contracted shop to provide the commodity and to complete the transaction. The shop-end computer has the function of calculating the accumulated transaction points corresponding every PIN (personal identification number) of the fare card for providing a bonus accumulated points promotion.

19 Claims, 4 Drawing Sheets

ON-BOARD WIRELESS TRANSACTION SYSTEM AND METHOD

BACKGROUND OF THE INVENTION

1. Field of the Invention

The present invention relates to an On-Board wireless transaction system and method and, more particularly, to such an On-Board wireless transaction system and method that enables the user to order commodities wirelessly in a vehicle and to complete the transaction on the real time. The aforesaid commodities include tangible goods and intangible services.

2. Description of Related Art

A motor vehicle may be equipped with a GSM wireless telephone system for contacting one's family and friends, as well as for dialing to a service center (for example, Travel the World Service Center) to ask for a variety of information services (stock, weather, traffic condition, department store promotion items, and etc.). There are motor vehicles equipped with a GPS (Global Position System) that enables the user to know the location of the motor vehicle and the business service information of nearby shops (such as location information of hotel, restaurant, theater, landscape spot, etc.).

However, the aforesaid systems enable the motor vehicle driver to obtain information only. When wishing to order attracted commodities, the driver shall have to dial the GSM system to contact the shop, directly requesting a reservation of the desired commodities by voice, or to contact the service center, indirectly asking the service center to make a reservation of the desired commodities. Because payment is not given in the reservation, the transaction is not completely done. The reserved commodities could be sold out to another person when the driver reached the shop.

Therefore, it is desirable to provide an On-Board wireless transaction system and method that eliminates the aforesaid drawbacks.

SUMMARY OF THE INVENTION

The main object of the present invention is to provide an On-Board wireless transaction system and method, which enables the user to order commodities wirelessly in the motor vehicle and complete the transaction on the real time.

It is another object of the present invention to provide an On-Board wireless transaction system and method, which automatically calculates the accumulated transaction points of every fare card for bonus accumulated points promotion.

To achieve these and other objects of the present invention, the On-Board wireless transaction system comprises an ordering device, a card reader/writer, a GSM modem, and a microprocessor. The ordering device is adapted for inputting an ordering demand to order at least one commodity and to produce a transaction data corresponding to the ordering demand, which transaction data including transaction points to be deducted due to the purchase of the at least one commodity been ordered. The card reader/writer is adapted for reading the data of a fare card, or writing data into the fare card. The GSM modem is adapted for connecting to a GSM wireless network and transmitting data to the network. The microprocessor is adapted for receiving the transaction data produced by the ordering device, controlling the card reader/writer to read the PIN (personal identification number) and value-added points of the fare card and to compare the value-added points of the fare card with the transaction points. If the number of the value-added points of the fare card is not smaller than the transaction points, the microprocessor immediately controls the GSM modem of the On-Board wireless transaction system to transmit the PIN of the fare card and the transaction data through the GSM wireless network to a GSM modem of a shop-end computer of a contracted shop, enabling the contracted shop to provide the commodity. Thereafter, the microprocessor calculates balance points of the fare card after deduction of the transaction points from the value-added points, and then controls the card reader/writer to write the balance points into the fare card, and then ends the transaction. Therefore, the invention enables the user to directly order commodities wirelessly in the motor vehicle and complete the transaction on the real time, which is different from a reservation only.

According to the present invention, the fare card can be an IC chip card, magnetic card, or any other equivalent card having data storage function. The transaction data, in addition to the aforesaid transaction points, further includes transaction time, commodity code and/or name, commodity unit price, or quantity. The card reader/writer is capable of writing each the aforesaid transaction data into the fare card to record transaction history.

The commodities orderable in the On-Board wireless transaction system can be all tangible goods (for example, theater/entertainment center ticket, season-change clothes, hotel first-night reserved room rate, restaurant deposit, vehicle repair and maintenance deposit, . . . and etc.), or intangible value-added services (for example, landscape point introduction, one-line fortune telling, multimedia audio/video program, . . . and etc.).

Further, the card issuing organization can also provide every contracted shop with a shop card for storing therein a PIN of the respective contracted shop and recording the accumulated points. Every contracted shop can use another card reader/writer of the shop-end computer to read/write its shop card, so as to add points obtained from each transaction to the shop card for further refunding from the issuing organization. The shop-end computer can calculate the accumulated transaction points corresponding to every PIN of the fare card for providing a bonus accumulated points promotion.

The On-Board wireless transaction method used in the aforesaid On-Board wireless transaction system comprises the steps of:

A) Using the ordering device to input an ordering demand, the ordering demand including a transaction data of transaction points to be deducted due to the purchase of at least one commodity been ordered, and controlling the card reader/writer of the On Board unit to read the PIN and the value-added points of the fare card;

B) Calculating balance points of the fare card after deduction of the transaction points from the value-added points; and C) Driving the GSM modem of the On Board Unit to wirelessly transmit the PIN of the fare card and the transaction data to the GSM modem of the shop-end computer of the contracted shop and then driving the card reader/writer of the On Board Unit to write the balance points into the fare card to complete the transaction.

The aforesaid method can be achieved by means of a software program, i.e., the method can be prepared by means of a computer language, and the prepared software program is loaded in a computer readable recording medium, which can be a hard disk, a floppy disk, a CD-ROM, a ZIP, a MO, an IC chip, or any available device containing the recording medium readable to the microprocessor usable to any person skilled in the art. Preferably, the software program is loaded in a RAM (random access memory) for updating easily.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
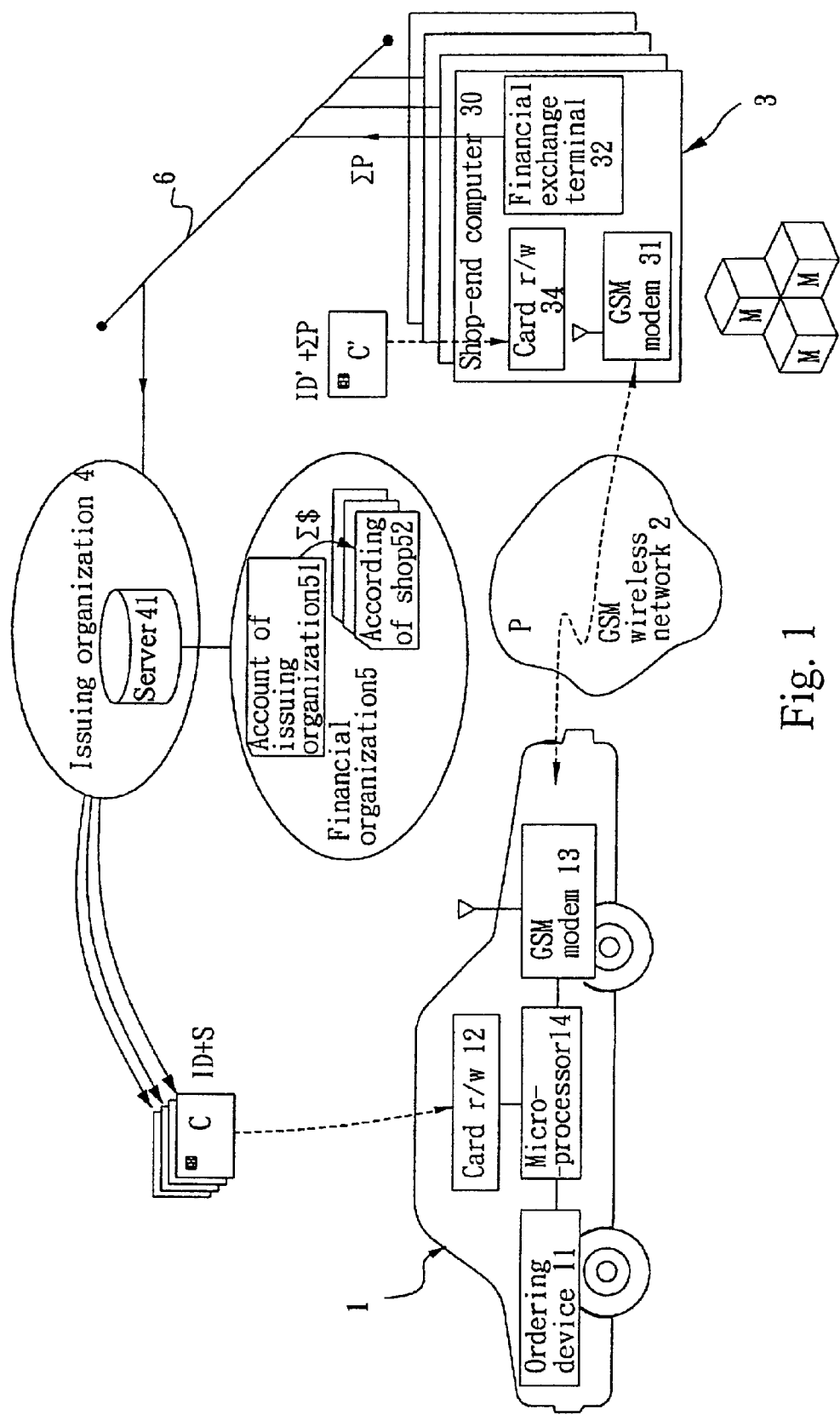
FIG. 1 is system architecture block diagram of an On-Board wireless transaction system according to the present invention.

With reference to FIG. 1, a conventional card issuing organization (for example, Mondex electronic cash system) 4 issued multiple fare cards C as usual. Every fare card C stores a respective PIN (personal identification number) and a predetermined number of value-added points S. When the user paid a certain amount of money to purchase a new fare card C from the issuing organization, the issuing organization stores a number of value-added points S in the fare card corresponding to the amount of money paid. The user can use the purchased fare card C to buy commodities from either of the contracted shops 3, and the shop 3 deducts the consumed points P from the value-added points S. Therefore, the fare card C is called as electronic cash, and used as cash.

The contracted shops 3 gather all the points ΣP they earned, and then issue a debit note and mail to the issuing organization 4 for payment. Alternatively, every shop 3 can link the financial exchange terminal 32 (i.e. fax machine, modem, etc.) of the respective shop-end computer 30 to the issuing organization 4 wirely through a PSTN (public switch telephone network) to provide the data for refunding the money. After the points and amount of the shop's debit note have been well checked, the server 41 of the issuing organization 4 transfers the money Σ$ from the issuing organization's account 51 in the financial organization 5 (such as a bank) to the account 52 of respective shop 3.

The invention is based on the conventional aforesaid financial interrex-change environment, basically, and moreover enables a transaction to be done wirelessly in a motor vehicle 1 on the real time. The commodities to be ordered in the On-Board wireless transaction system of the present invention can be any tangible goods (for example, theater/entertainment center ticket, season-change clothes, hotel first-night reserved room rate, restaurant deposit, vehicle repair and maintenance deposit, . . . and etc.), or intangible value-added services (for example, landscape point introduction, one-line fortune telling, multimedia audio/video program service, . . . and etc.).

The fare card C is preferably an IC chip card for the advantage of high storage capacity. Of course, a magnetic card, or any other equivalent card having data storage function may be used.

FIG. 1 shows the On Board Unit 1 (OBU) of a vehicle connected to the GSM modems 31 of the shop-end computers 30 of multiple contracted shops 3 through a GSM wireless network 2 to order commodities from the shops 3. The On Board Unit 1 comprises an ordering device 11, a card reader/writer 12, a GSM modem 13, and a microprocessor 14. The ordering device 11, the card reader/writer 12, and the GSM modem 13 are respectively connected to the microprocessor 14.

Figure 2:
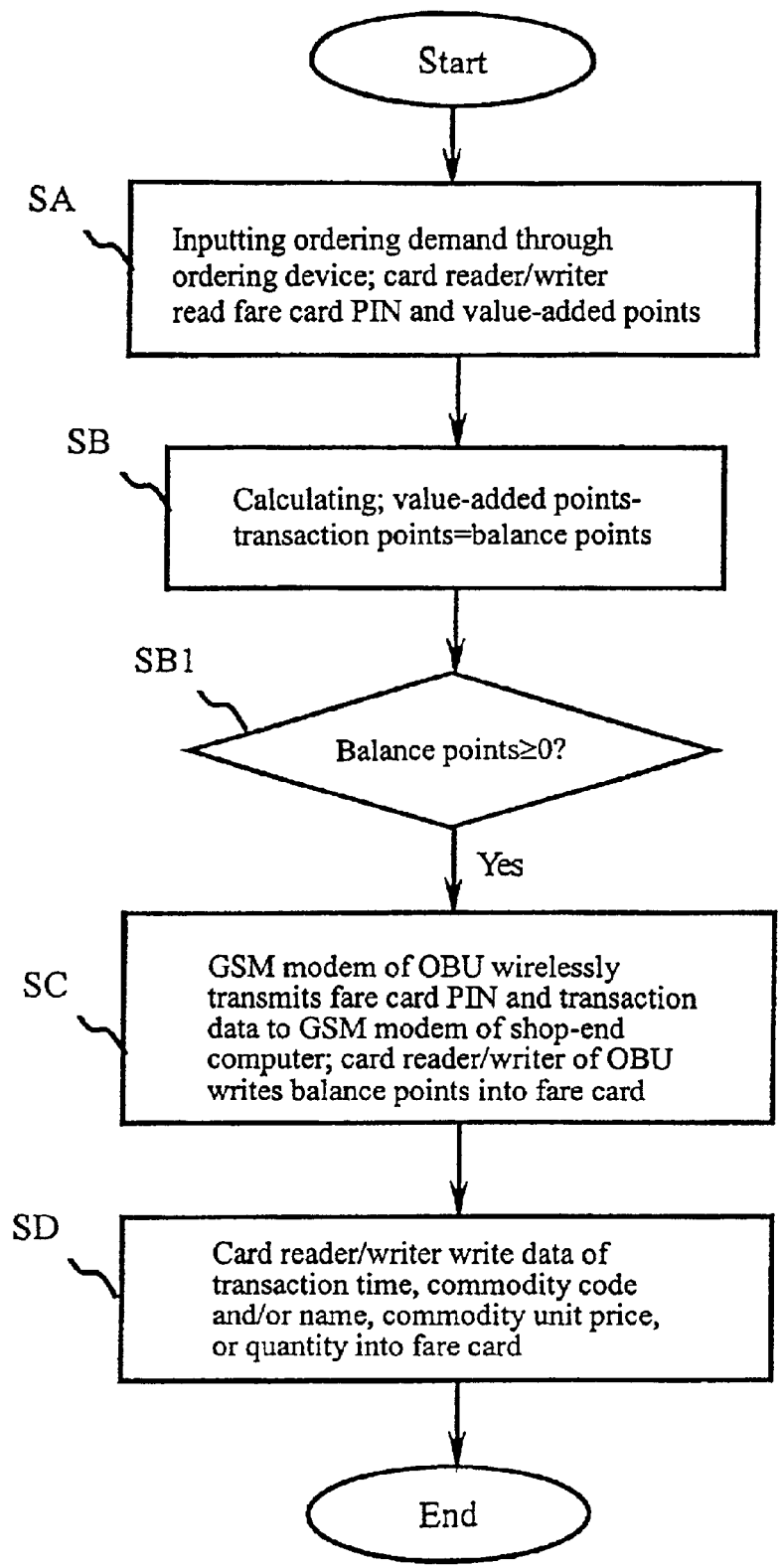
FIG. 2 is a flow chart explaining the transaction method through the On-Board wireless transaction system according to the present invention.

Before ordering commodities M from the contracted shops 3 of the issuing organization 4 through the GSM wireless network 2, the user must purchase a fare card C in advance. When starting a wireless transaction, it runs subject to the steps shown in FIG. 2:

Step SA: Use the ordering device 11 to input an ordering demand. The ordering device 11 can be as simple as a touch button, a keyboard, or a browser. For example, the staff of a service center may assist the user to download commodity menu for ordering, enable the user to browse the menu on the screen and ordering the desired commodity M with the touch bottom or touch screen. After input of an ordering demand, a transaction data D is produced. The transaction data D includes the transaction points P to be deducted for the purchase of the commodity M concerned. Further, to the card reader/writer 12 reads the PIN and the value-added points S stored in the fare card C.

Step SB: The microprocessor 14 calculates balance points R of the fare card by deducting the transaction points P from the value-added points S, and then (Step SB1) compares the balance points R with 0, so as to judge if the value-added points S of the fare card C is enough or not when the balance points R is greater or equal to 0. Alternatively, the microprocessor 14 can be controlled to directly compare the value-added points S with the transaction points P. If the comparison result indicates the value-added points S not smaller than the transaction points P of the transaction data D, it means the transaction can be continued.

Figure 3:
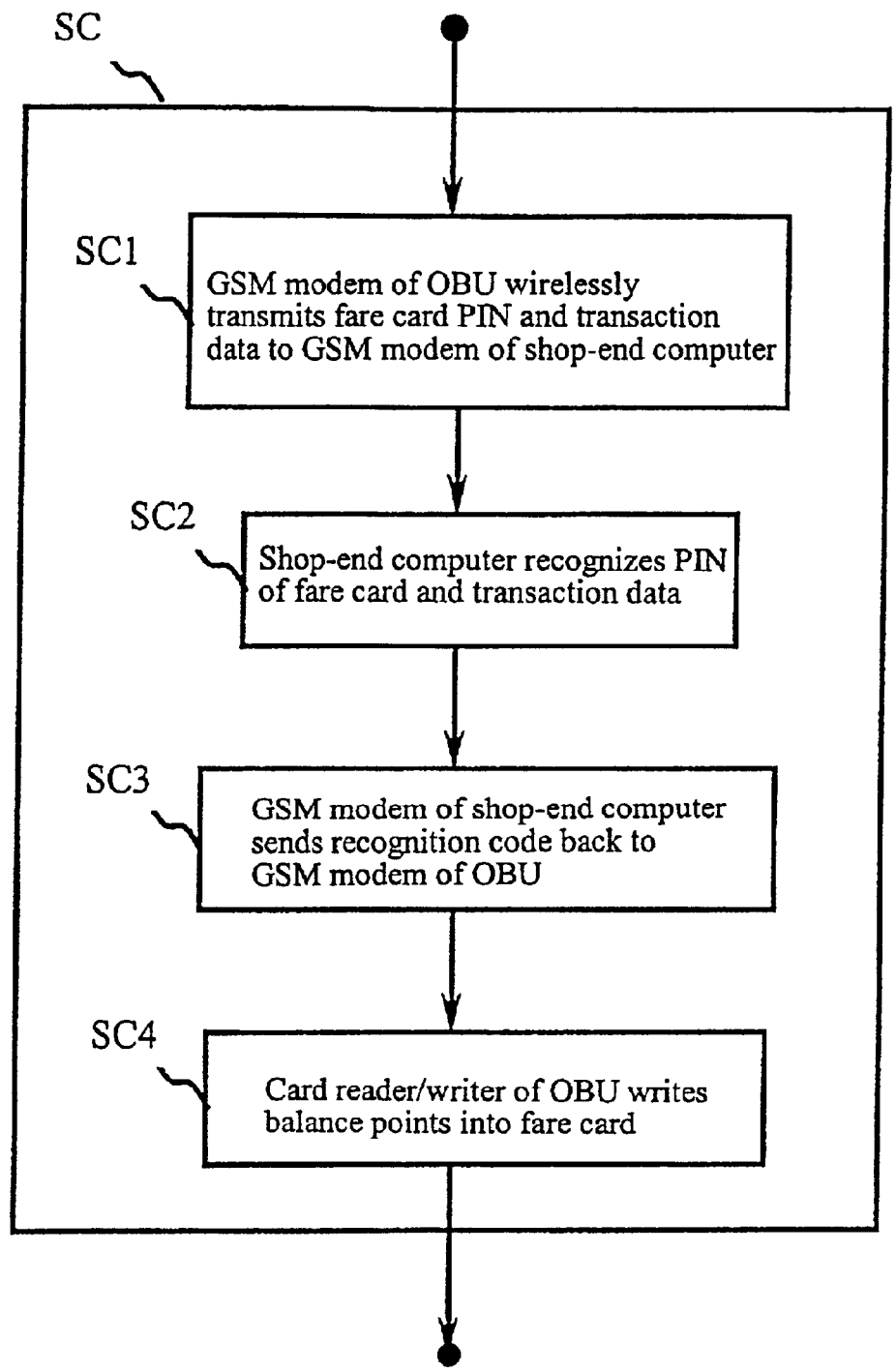
FIG. 3 is a detailed flow chart of the present invention.

Step SC: The GSM modem 13 of the On Board Unit 1 is wirelessly connected to the GSM wireless network 2, and the PIN of the fare card C and the transaction data D (including transaction points P) are transmitted to the GSM modem 31 of the shop-end computer 30 (Step SC1). In this embodiment, please see also FIG. 3, the shop-end computer 30 recognizes the PIN of the fare card C and the transaction data D (including transaction points P) first for security reason. When recognized (Step SC2), the shop 3 provides the ordered commodity M by mail, data download . . . etc to the user, and feeds back a recognition code to the GSM modem 13 of the On Board Unit 1 (Step SC3), causing the card reader/writer 12 of the On Board Unit 1 to write the balance points R obtained from the aforesaid calculation into the fare card C and then to complete the transaction (Step SC4).

As indicated above, the invention enables the user to order commodities wirelessly in the motor vehicle and complete the transaction on the real time. The aforesaid transaction data D may further include the data of transaction time, commodity code and/or name, commodity unit price, or quantity. The card reader/writer 12 writes all the transaction data in the fare card C for use as history record.

For easy management, the issuing organization 4 provides a shop card C' to every contracted shop 3, so that every contracted shop 3 can use the card reader/writer 34 of the shop-end computer 30 to write the accumulated points ΣP into the shop card C', or to output the accumulated points ΣP and the PIN ID' of the shop card C' to the server 41 of the issuing organization 4 when asking for payment.

Figure 4:
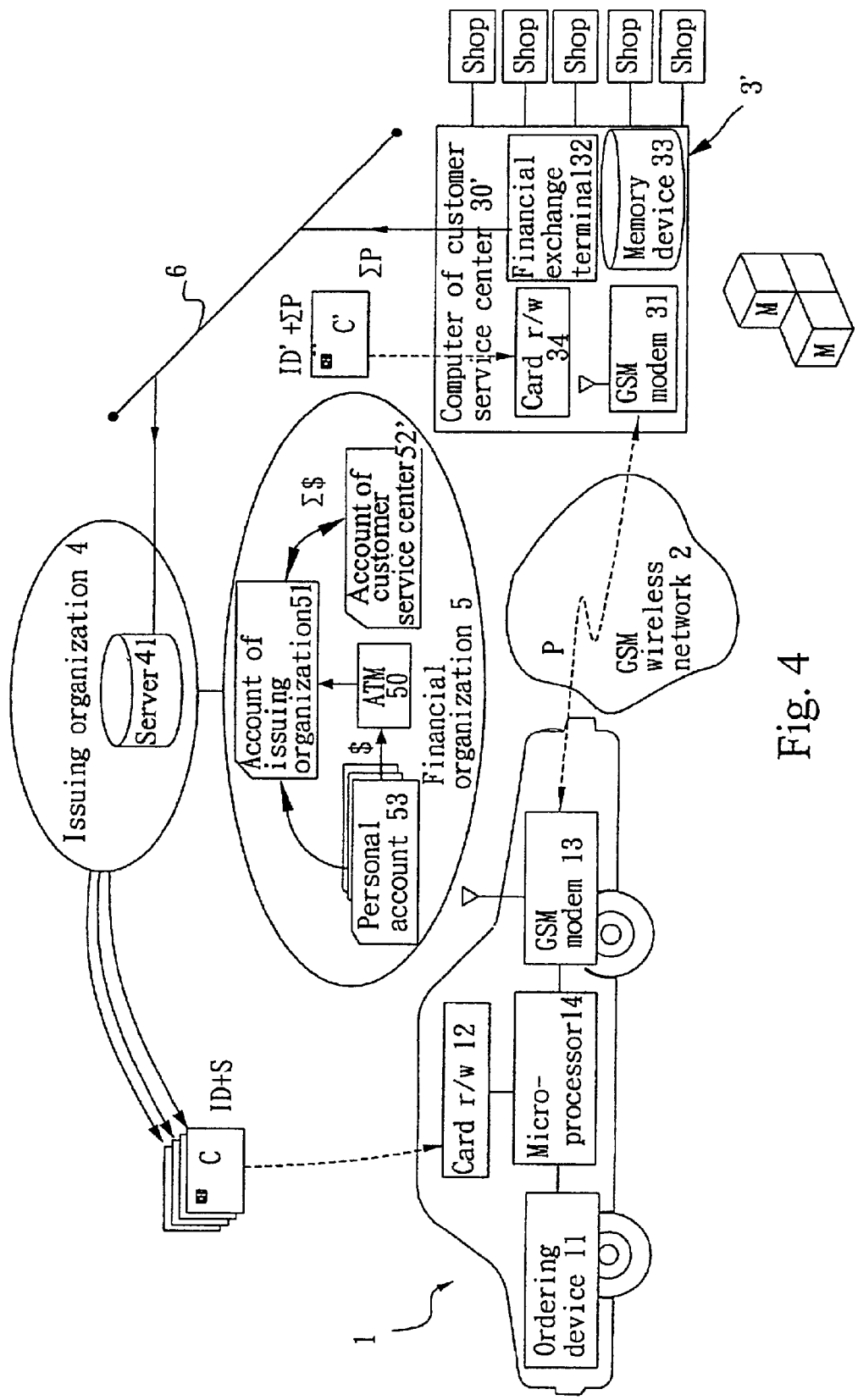
FIG. 4 is a system architecture block diagram of an alternate form of the On-Board wireless transaction system according to the present invention.

FIG. 4 shows an alternate form of the present invention. According to this alternate form, the On Board Unit 1 is same as the embodiment shown in FIG. 1, however the contracted shops are integrated into a customer service center 3' that receives all orders, deducts purchased points, and distributes points to every shop after transaction. Therefore, the user needs only to remember the telecommunication number of the customer service center 3', and needs not to remember several telecommunication numbers of each of contracted shops. Further, the computer 30' of the customer service center 3' calculates the accumulated transaction points P of every PIN to decrease the calculating load of shop, and to arrange an accumulated bonus promotion activity for the user.

As illustrated in FIG. 4, the GSM modem 13 of the On Board Unit 1 is wirelessly connected to the GSM modem 31 of the computer 30' of the customer service center 3', enabling every transaction to be done on the real time. A memory device 33 is provided for the storage of multiple transaction data D temporarily, so that the GSM modem 31 of the computer 30' of the customer service center 3' can be connected to the server 41 of the issuing organization 4 later at a particular time to exchange information, preventing network line busy.

Further, in either of the aforesaid two embodiments, the fare card C has a predetermined value-added points S stored therein when new buy. Upon the points S using up, the user can use an auto teller machine 50 (shown as FIG. 4) to transfer an amount of money from the user's personal account 53 in a financial organization 5 to the account 51 of the issuing organization 4 in the financial organization 5, so as to purchase new points, enabling purchased points to be written in the fare card C.

Alternatively, the customer service center 3' can transfer an amount of money from her account 52' in the financial organization 5 to the account 51 of the issuing organization 4 in the financial organization 5 to purchase a lot of points in advance, so that an user can ask the customer service center 3' for help when in the motor vehicle and unable to go to an auto teller machine 50 to transfer the money. In this case, the customer service center 3' uses the GSM modem 31 of the computer 30' to download wirelessly a small amount of points to the GSM modem 13 of the On Board Unit 1 and to write the small amount of points into the user's fare card C for use. Thereafter, the customer service center 3' issues to the issuing organization 4 a debit note subject to the transaction data D (including the PIN of the user's fare card C and the downloaded points P), asking the issuing organization 4 for payment. When the debit note checked, the issuing organization 4 transfers the amount requested from the account 51 of the issuing organization 4 in the financial organization 5 to the account 52' of the customer service center 3' in the financial organization 5, and then demands the user's account 53 in the financial organization 5 subject to the PIN of the fare card C for refunding the money.

The On-Board wireless transaction method can be written as a software program with computer language. The software program thus prepared can be stored in a recording medium readable to a microprocessor, or stored in any device containing the recording medium. The device containing the recording medium readable to the microprocessor can be a hard disk, a floppy disk, a CD-ROM, a ZIP, a MO, an IC chip, a RAM, or any available device containing the recording medium readable to the microprocessor usable to any person skilled in the art.

Although the present invention has been explained in relation to its preferred embodiment, it is to be understood that many other possible modifications and variations can be made without departing from the spirit and scope of the invention as hereinafter claimed.

What is claimed is:

1. An On-Board wireless transaction system used in a motor vehicle and adapted for connecting through a GSM wireless network to one of a number of shops contracted with an issuing organization to order commodities and to complete the transaction, said issuing organization issued multiple fare cards, said fare cards each having a respective PIN (personal identification number) and a predetermined number of value-added points, said shops each having a shop-end computer, said shop-end computer having a GSM modem adapted for receiving an order from the On-Board wireless transaction system of said motor vehicle, the On-Board wireless transaction system comprising:

an ordering device adapted for inputting an ordering demand to order at least one commodity and to produce a transaction data corresponding to the ordering demand, said transaction data including transaction points to be deducted due to the purchase of the at least one commodity been ordered;

a card reader/writer adapted for reading data from the fare card, or writing data into the fare card;

a GSM modem adapted for connecting to said GSM wireless network for data transmission; and a microprocessor adapted for receiving the transaction data produced by said ordering device, controlling said card reader/write to read the PIN and value-added points of the fare card and to compare the value-added points of the fare card with the transaction points, controlling the GSM modem of the On-Board wireless transaction system to transmit the PIN of the fare card and the transaction data through said GSM wireless network to the GSM modem of the shop-end computer of the respective contracted shop, if the number of the value-added points of the fare card is not smaller than the transaction points, for enabling the respective contracted shop to provide the commodity, calculating balance points of the fare card after deduction of the transaction points from the value-added points, and controlling the card reader/writer to write the balance points into the fare card after each transaction.

2. The On-Board wireless transaction system as claimed in claim 1, wherein said issuing organization provides a shop card to each of said contracted shops, said shop card having stored therein a PIN (personal identification number) of the respective contracted shop and accumulated points; the shop-end computer of each of said contracted shops comprises a card reader/writer adapted for writing data in the shop card of the respective shop, or reading data from the shop card.

3. The On-Board wireless transaction system as claimed in claim 1, wherein the shop-end computer of each of said contracted shops is adapted for calculating the accumulated transaction points corresponding to every PIN of the fare card for providing a bonus accumulated points promotion.

4. The On-Board wireless transaction system as claimed in claim 1, wherein the shop-end computer of each of said contracted shops is connected to said issuing organization through a PSTN (public switch telephone network) to ask for payment.

5. The On-Board wireless transaction system as claimed in claim 4, wherein the shop-end computer of each of said contracted shops further comprises a financial exchange terminal connected to said issuing organization for data transmission.

6. The On-Board wireless transaction system as claimed in claim 1, wherein the shop-end computer of each of said contracted shops comprises memory means adapted for storing multiple transaction data.

7. The On-Board wireless transaction system as claimed in claim 1, wherein said fare card is an IC chip card.

8. The On-Board wireless transaction system as claimed in claim 1, said transaction data further includes at least one data chosen from transaction time, commodity code and/or name, commodity unit price, and quantity.

9. The On-Board wireless transaction system as claimed in claim 1, wherein the card reader/writer of the On-Board wireless transactions system is further adapted for writing at least one data chosen from transaction time, commodity code and/or name, commodity unit price, and quantity into the fare card.

10. An On-Board wireless transaction method used in an On Board Unit of a motor vehicle for ordering commodities from one of a number of shops contracted with an issuing organization through a GSM wireless network and completing the transaction, said On Board Unit comprising an ordering device, a card reader/writer, and a GSM modem, said issuing organization issued multiple fare cards, said fare cards each having a respective PIN (personal identification number) and a predetermined number of value-added points, said shops each having a shop-end computer, said shop-end computer having a GSM modem adapted for receiving an order wirelessly from said On Board unit of said motor vehicle, the On Board wireless transaction method comprising the steps of:

A) using said ordering device to input an ordering demand, said ordering demand including a transaction data of transaction points to be deducted due to the purchase of at least one commodity been ordered, and controlling the card reader/writer of said On Board unit to read the PIN and the value-added points of the fare card;

B) calculating balance points of the fare card after deduction of said transaction points from said value-added points; and C) driving the GSM modem of said On Board Unit to wirelessly transmit the PIN of the fare card and the transaction data to the GSM modem of the shop-end computer of the contracted shop, and then driving the card reader/writer of said On Board Unit to write the balance points into the fare card to complete the transaction.

11. The On-Board wireless transaction method as claimed in claim 10 further comprising, after Step C), step D of driving the card reader/writer of said On Board Unit to write at least one data chosen from transaction time, commodity code and/or name, commodity unit price, and quantity in the fare card.

12. The On-Board wireless transaction method as claimed in claim 10, wherein said Step C) comprises the sub-steps of:

1) driving the GSM modem of said On Board Unit to wirelessly transmit the PIN of the fare card and the related transaction data to the GSM modem of the shop-end computer;

2) driving the connected shop-end computer to recognize the correctness of the PIN of the respective fare card and the related transaction data;

3) driving the GSM modem of the connected shop-end computer to send back a recognition code to the GSM modem of said On Board Unit; and 4) driving the card reader/writer of said On Board Unit to write the balanced points into the fare card to complete the transaction.

13. The On-Board wireless transaction method as claimed in claim 10, wherein said issuing organization provides a shop card to each of said contracted shops, said shop card having stored therein a PIN (personal identification number) of the respective contracted shop and accumulated points; the shop-end computer of each of said contracted shops comprises a card reader/writer adapted for writing data in the shop card of the respective shop, or reading data from the shop card.

14. The On-Board wireless transaction method as claimed in claim 10, wherein the shop-end computer of each of said contracted shops is adapted for calculating the accumulated transaction points corresponding to every PIN of the fare card for providing a bonus accumulated points promotion.

15. A computer readable recording medium used in an On Board Unit of a motor vehicle, said recording medium comprising a software program adapted for ordering commodities from one of a number of shops contracted with an issuing organization through a GSM wireless network and completing the transaction, said On Board Unit comprising an ordering device, a card reader/writer, and a GSM modem, said issuing organization issued multiple fare cards, said fare cards each having a respective PIN (personal identification number) and a predetermined number of value-added points, said shops each having a shop-end computer, said shop-end computer having a GSM modem adapted for receiving an order wirelessly from said On Board unit of said motor vehicle, the software program comprising:

first program code means adapted for receiving an ordering demand inputted through said ordering device, said ordering demand including a transaction data of transaction points to be deducted due to the purchase of at least one commodity been ordered;

second program code means adapted for controlling the card reader/writer of said On Board unit to read PIN and the value-added points of the fare card;

third program code means adapted for calculating balance points of the fare card after deduction of said transaction points from the value-added points;

fourth program code means adapted for controlling the GSM modem of said On Board Unit to wirelessly transmit the PIN of the fare card and the transaction data to the GSM modem of the shop-end computer of the contracted shop; and fifth program code means adapted for controlling the card reader/writer of said On Board Unit to write the balance points into the fare card to complete the transaction.

16. The recording medium as claimed in claim 15 further comprising sixth program code means adapted for controlling the card reader/writer of the On Board Unit to write at least one data chosen from transaction time, commodity code and/or name, commodity unit price, and quantity into the fare card.

17. The recording medium as claimed in claim 15 further comprising seventh program code means adapted for receiving a recognition code from the shop-end computer of the contracted shop, and driving said fifth program code means to control the card reader/writer of said On Board Unit to write the balance points into the fare card to complete the transaction.

18. The recording medium as claimed in claim 15, wherein said issuing organization provides a shop card to each of said contracted shops, said shop card having stored therein a PIN (personal identification number) of the respective contracted shop and accumulated points; the shop-end computer of each of said contracted shops comprises a card reader/writer adapted for writing data in the shop card of the respective shop, or reading data from the shop card.

19. The recording medium as claimed in claim 15, wherein the shop-end computer of each of said contracted shops is adapted for calculating the accumulated transaction points corresponding to every PIN of the fare card for providing a bonus accumulated points promotion.

* * * * *